July 4, 1950     F. PERLIN     2,513,740

FILM CARRYING CARTRIDGE FOR CAMERAS

Filed March 12, 1948

INVENTOR.
FRED PERLIN
BY
*Maxwell F. Spasan*
ATTORNEY

Patented July 4, 1950

2,513,740

UNITED STATES PATENT OFFICE 2,513,740

FILM CARRYING CARTRIDGE FOR CAMERAS

Fred Perlin, Bell Harbor, N. Y., assignor to Perlin Development Corporation, New York, N. Y., a corporation of New York Application March 12, 1948, Serial No. 14,598

16 Claims. (Cl. 95—38)

The present invention relates to film-carrying cartridges for photographic cameras and the like and, more particularly though not exclusively, to film-carrying cartridges adapted to be used with miniature cameras of the character disclosed in my co-pending United States patent application Ser. No. 788,418, filed November 28, 1947, wherein the cartridge forming the subject matter of the present specification has been described but not claimed per se.

An object of the present invention is to provide a film-carrying cartridge which may be conveniently loaded so as to be ready for instantaneous use while protecting the film held therein from accidental exposure to light.

Another object of the invention is to provide a film-carrying cartridge which will safely retain a film when detached from the camera for which it is intended, and which will protect such film from light regardless whether all or part of the available exposures have or have not been made.

A further object of the invention is to provide film-carrying means for miniature cameras of the character described in my above-identified co-pending application.

The above and other objects and features of the invention will become apparent from the following description, taken in conjunction with the accompanying drawing in which.

Figure 1:
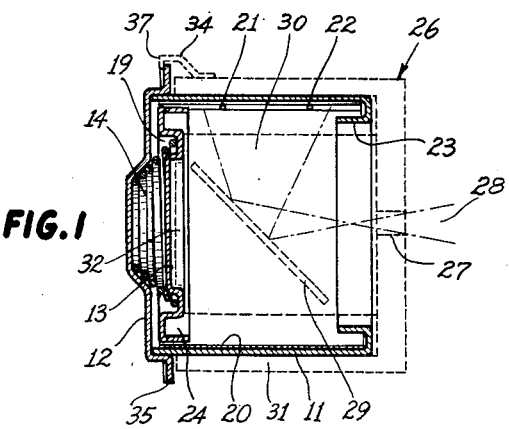
Fig. 1 shows, in longitudinal cross section, a film-carrying cartridge according to the invention, the cartridge being in compressed position while inserted into a camera indicated in dotted lines.

The cartridge 10 shown in the drawing consists of the following parts: A cylindrical shell 11, a dished rear wall 12 securely fitting over the rear end of the shell 11, a disc 13 slidably held in the shell 11, and a spring 14 tending to displace the disc 13 toward the front end of the shell.

The member 12 is provided with a rim 15 which may be press-fitted (Figs. 1 and 2) or screwed (Fig. 3) onto the shell 11 which, in the latter case, may be provided with a suitable thread 16 mating with a complementary thread 17 provided on the inside of the rim 15. Member 12 is also formed at its center with a circular recess 18 serving as a seat for the reduced end of the conical spring 14. The enlarged or front end of the spring 14 is received by an annular channel 19 provided on the rear face of disc 13.

Removal of the rear wall or cap 12 will permit the insertion of a flat strip of film 20 bent into cylindrical form, the film by virtue of its inherent resiliency resting firmly against the inner peripheral surface of the shell 11. Means for locating the edges of the film 20 may be provided in the form of one or more internal projections of the shell 11, such as the dimples 21, 22 shown in Figs. 1 and 2.

Figure 2:
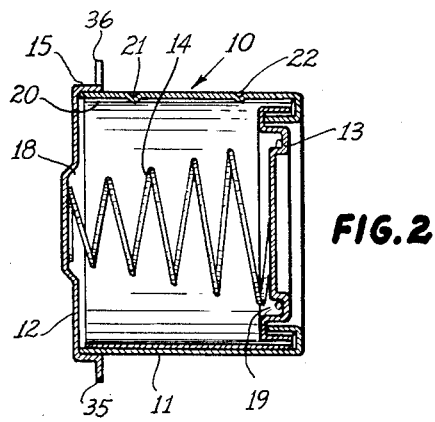
Fig. 2 is a view similar to Fig. 1, with the cartridge removed from the camera and in expanded position.
Figure 3:
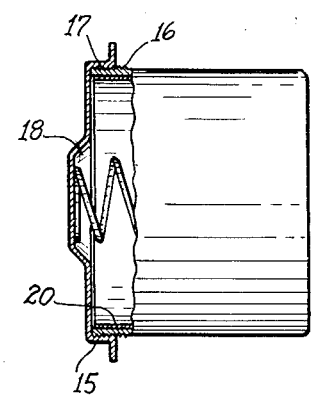
Fig. 3 is a view similar to Fig. 2, partly in elevation, showing a modification of the cartridge illustrated in Figs. 1 and 2.
Figure 5:
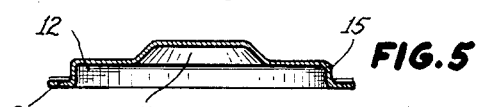
Fig. 5 is a cross section of the said rear wall, taken on line 5—5 of Fig. 4.
Figure 6:
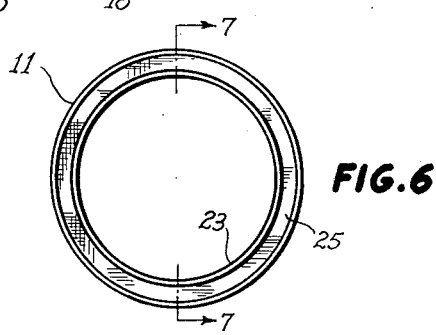
Fig. 6 is a rear view of the cylindrical shell of the cartridge.
Figure 7:
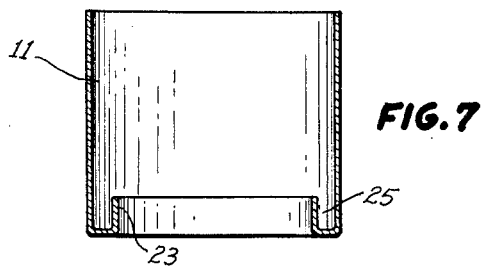
Fig. 7 is a cross section of said cylindrical shell, taken on line 7—7 of Fig. 6.
Figure 8:
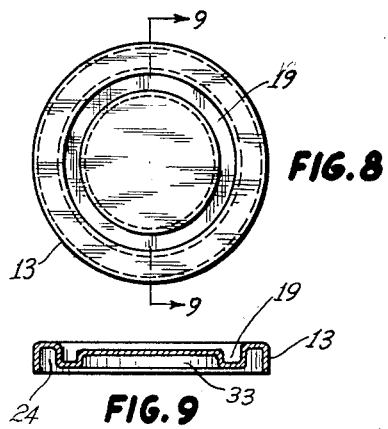
Fig. 8 is a rear elevation of a disc forming the front wall of the cartridge when the latter is in its expanded position shown in Fig. 2.
Figure 9:
Fig. 9 is a cross section of said disc, taken on line 9—9 of Fig. 8.

The shell 11 is formed with an inturned lip 23 which, in the position of the cartridge shown in Fig. 2, enters an annular channel 24 provided on the front face of the disc 13, thereby constituting a light trap which will shut out all light rays and thus prevent spoilage of the film 20 while the cartridge 20 is detached from the photographic apparatus for which it is designed. Preferably, the lip 23 is of appreciable axial extent and the channel 24 of sufficient depth to prevent any exposure of the film even if the disc 13 should, by accident, be slightly displaced inward during handling. Suitable stops, not shown, may of course be provided and the film 20 dimensioned so that the same will not extend into the annular channel 25 existing between the lip 23 and the cylindrical wall of shell 11 since, as will appear from the following, the portion of film held within the latter channel will remain unused.

The manner of using the cartridge 10 for making photographic pictures is illustrated in Fig. 1, wherein there is shown in dotted lines a camera 26 having a frontal opening 27 through which a beam of light 28 may be projected upon a mirror 29 which directs said beam upon the inner, photosensitive surface of film 20. The opening 27 may be a pinhole in which case no further optical apparatus will be required, except for the usual shutter mechanism (not shown); or the mirror 27 may be preceded by a suitable lens system for focusing purposes.

As fully described in my aforesaid co-pending application, the deflecting element 27 may be mounted on a rigid member 30 which, when the cartridge 10 is inserted into the tubular housing 31 of the camera 26, engages the slidable disc 13 and pushes it back toward the rear of the cartridge, thereby compressing the conical spring 14 as clearly seen in Fig. 1. Member 30 is desirably formed with a projection 32 which enters a central depression 33 formed on the disc 13, thereby preventing axial displacement of the disc and enabling the same to be displaced without scratching the surface of the film 20.

Figure 4:
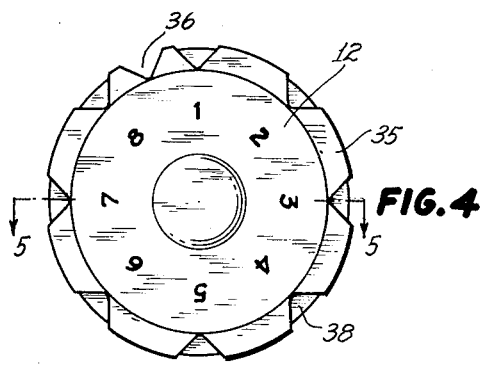
Fig. 4 is a face view of a cap member forming the rear wall of the cartridge shown in the preceding figures.

The camera 26 preferably carries a resilient catch 34 designed to engage the flange 35 of rim 15, thereby retaining the cartridge 10 within housing 31 and forcing the spring 14 to remain in the compressed position shown. For this purpose, the flange 35 is provided with an indentation 36, through which the tongue 37 of the catch 34 may pass, and with a set of recesses 38 (eight in Fig. 4) against which the said tongue 37 comes to rest when the cartridge is rotated relative to the housing 31. Thus it will be possible to index the cartridge 10 and, with it, the film 20 in eight different angular positions relative to the camera 26 and the mirror 29, whereby eight different exposures may be made on said film. After the last or eighth exposure has been made, a further rotation of the member 12 in counter-clockwise direction (as viewed in Fig. 4) will once more align the indentation 36 with the catch 34 which will thus release the flange 35, permitting the spring 14 to expand and to eject the cartridge 10 from the housing 31.

The usefulness of a cartridge according to the invention is not limited to its employement with cameras designed to produce a plurality of distinct photographic pictures on a single film, nor yet to arrangements wherein light rays are focused into a beam. The invention may thus find application with so-called panoramic or wide-angle cameras wherein a rotating projecting mechanism successively exposes the entire film during a single picture-taking operation; and it may also be used in connection with devices for determining the luminosity or radiation intensity of objects by exposing a suitably sensitized surface to visible or invisible radiation from such objects. At the same time, the term "film" includes not only strips of Celluloid or the like but any carrier of photosensitive surfaces (for example, a glass cylinder) adapted to be positioned adjacent the inner cylindrical surface of the shell 11 of cartridge 10.

Furthermore, while the cartridge has been shown and described as having a cylindrical shell, the latter may also be a tube of non-circular (e. g. polygonal) cross section.

Accordingly, the invention is not to be considered as being limited to the specific forms thereof described and illustrated, but on the contrary may be embodied in a great number of ways without departing from the spirit or exceeding the scope of the invention as defined in the objects and in the appended claims.

I claim:

1. A film-carrying cartridge comprising: a cylindrical shell adapted to have a photosensitive element positioned therein adjacent to its inner surface; a cap forming a closure member for the rear end of the shell, said cap being provided with a circular rim fitting securely over the rear end of the shell; an inturned lip on the front end of the shell; a disc slidable within said shell and provided on its front face with a recess adapted to receive said lip, whereby a light trap is formed; and a coiled spring confined between the closure member and the cap and yieldingly maintaining the lip and recess in engagement with each other, said cap being provided with a recess adapted to receive one end of the spring and the disc being provided on its rear face with a recess adapted to receive the other end of the spring.

2. A cartridge according to claim 1, wherein the spring is of conical configuration having a reduced end adjacent to the cap and an enlarged end adjacent to the disc.

3. A cartridge according to claim 1, wherein the rim is provided with a radially extending flange having means for indexing the cartridge in a plurality of angular positions.

4. A cartridge according to claim 3, wherein the shell is provided with at least one internal projection adapted to determine the location of the photosensitive element relative to the shell and to said indexing means.

5. A cartridge according to claim 1, wherein the cap is adapted to be press-fitted onto the shell.

6. A cartridge according to claim 1, wherein the cap is adapted to be screw-threaded onto the shell.

7. A cartridge according to claim 1, wherein the disc is provided on its front face with a surface formation engageable by external guiding means.

8. A film cartridge for cameras, comprising: a tubular shell and end walls closing the ends of the shell, one of said end walls being freely movable axially into the interior of the shell from a closed position; a light trap between the movable end wall and the tubular shell, comprising cooperating interlocking annular walls on said movable end wall and the tubular shell; and means yieldingly holding the movable end wall in its closed position defined by the interlocking engagement of said annular walls, said movable end wall being movable from its closed position by an external force applied thereon and being movable by such external force to a position permitting exposure of a photosensitive element overlying the inner wall of the tubular shell.

9. A film cartridge for cameras, comprising: a substantially cylindrical shell and an end wall secured to one end of the shell to close the same; a depressible end wall smaller in diameter than the inside of the shell axially movable within the shell; cooperating interengageable means on the periphery of the depressible end wall and the other end of the shell for limiting outward movement of said depressible end wall and thereby defining its closed position, said interengageable means including an inwardly directed annular flange on the shell spanning the distance between the shell and the depressible end wall; means yieldingly holding the depressiible end wall in its closed position engaging said flange; and guide means on said depressible end wall engageable with an external guide by which opening force may be applied upon the depressible end wall and by which the depressible end wall is guided along the axis of the cartridge to guard against contact of said depressible end wall with a film strip overlying the inner wall of the shell.

10. A film cartridge for cameras, comprising: a tubular shell adapted to receive a photosensitive element and to hold the same in a position overlying the inner wall thereof; a cap readily removably mounted on one end of the shell to close the same while enabling access to the interior of the cartridge for insertion and removal of the photosensitive element; an axially depressible end wall for closing the other end of the shell, said end wall being sufficiently smaller in diameter than the inside of the shell to enable axial movement of the end wall within the shell without contacting a photosensitive element in position in the shell; a light trap between the axially depressible end wall and the cylindrical shell comprising interlocking annular walls on the periphery of said end wall and the end of the shell which it closes, engagement of said cooperating interlocking annular walls limiting outward movement of the end wall, and defining the closed position thereof; and means yieldingly maintaining the end wall in its thus defined closed position from which it is movable by the application of external force thereon.

11. The film cartridge of claim 10 further characterized by the provision of guide means on said depressible end wall engageable by an external guide whereby movement of said depressible end wall is guided along the axis of the cartridge to guard against contact between said depressible end wall and a film strip in position in the cartridge.

12. A film cartridge for cameras, comprising: a tubular shell; an end wall secured to one end of the shell to close the same; a depressible end wall slidably received within the shell; a light trap between the tubular shell and said depressible end wall comprising cooperating interlocking annular walls on the periphery of the depressible end wall and the other end of the tubular shell, engagement of said cooperating interlocking annular walls limiting outward movement of said depressible end wall and thereby defining its closed position; and means biasing said depressible end wall to its closed position, said means enabling depression of said end wall into the shell to permit the exposure of a film strip overlying the inner wall of the shell.

13. A film carrying cartridge comprising: a cylindrical shell adapted to receive a photosensitive element in overlying relationship to its inner cylindrical surface; means for circumferentially positioning a photosensitive element so placed; a cap detachably engaging one end of the shell to close the same, said cap being confined to the end portion of the shell it closes and the cylinder of the cylindrical shell being free from external obstructions which would interfere with insertion of the shell into a close fitting socket; a disc slidable within the shell; means on the other end of the shell forming an abutment for said disc; a light trap formed by the engaging surfaces of the disc and said abutment; and an expanding spring interposed between said cap and said disc yieldingly holding the latter against said abutment and thereby rendering the light trap effective to exclude light from the interior of the shell.

14. A cartridge according to claim 13, wherein the abutment-forming means comprises an inturned lip on said other end of the shell, and the disc is provided with an annular channel adapted to receive said inturned lip whereby a light trap is formed.

15. A film cartridge for cameras, comprising: a cylindrical light proof receptacle having side and end walls; a single convolution of film overlying the inner surface of the side wall; means on the side wall for positioning said film circumferentially within the recetpacle; one of said end walls being freely depressible into the interior of the receptacle from its closed position by an external force applied thereto, such depression of said end wall rendering the film in the receptacle accessible for exposure; and means yieldingly maintaining the depressible end wall in its closed position.

16. A film cartridge for cameras, comprising: a light proof receptacle having side and end walls; a single convolution of film overlying the inner surface of the side wall; one of said end walls being depressible into the interior of the receptacle to render the film accessible for photographic exposure; a spring resisting such depression of said end wall; an abutment on the side wall against which said depressible end wall is held by the spring; and a light trap at the junction of the abutment and the periphery of the depressible end wall.

FRED PERLIN.

REFERENCES CITED

The following references are of record in the file of this patent:

UNITED STATES PATENTS

| Number | Name | Date |
|---|---|---|
| 1,070,400 | Brieloff | Aug. 19, 1913 |
| 1,764,450 | Hindle | June 17, 1930 |
| 1,842,442 | Ames | Jan. 26, 1932 |
| 1,957,043 | Harlow | May 1, 1934 |
| 2,083,492 | Cheshire | June 8, 1937 |